United States Patent [19]

Sjöström

[11] Patent Number: 5,049,336
[45] Date of Patent: Sep. 17, 1991

[54] METHOD OF CONNECTING A GRIPPING DEVICE TO A SHEET OR WEB-FORMED PACKAGING LAMINATE

[75] Inventor: Anders Sjöström, Lund, Sweden

[73] Assignee: AB Profor, Lund, Sweden

[21] Appl. No.: 450,441

[22] Filed: Dec. 14, 1989

[30] Foreign Application Priority Data

Dec. 16, 1988 [SE] Sweden ................................ 8804549

[51] Int. Cl.⁵ ............................................. B29C 45/14
[52] U.S. Cl. ..................................... 264/154; 264/255; 264/267; 264/274; 156/344
[58] Field of Search ............... 264/267, 154, 273, 274, 264/250, 255; 156/344

[56] References Cited

U.S. PATENT DOCUMENTS

| | | | |
|---|---|---|---|
| 2,071,921 | 2/1937 | Dickson | 264/273 |
| 2,300,594 | 11/1942 | Rehfeld | 264/273 |
| 3,890,679 | 6/1975 | Simon | 264/273 |
| 4,338,278 | 7/1982 | Schultz | 264/273 |
| 4,409,163 | 10/1983 | Von Manen | 264/273 |
| 4,884,312 | 12/1989 | Clark | 264/273 |

FOREIGN PATENT DOCUMENTS 0065220  11/1982  European Pat. Off. .
1149545  4/1969  United Kingdom .

Primary Examiner—Jay H. Woo
Assistant Examiner—Jeremiah F. Durkin, II
Attorney, Agent, or Firm—Burns, Doane, Swecker & Mathis

[57] ABSTRACT

A method of attaching a gripping device to a packaging laminate involves forming a recess in a packaging laminate that extends only a part of the way through the thickness of the packaging laminate. Molten plastic material is injected into the recess to cause the molten plastic material to become partly united with plastic layers that cover the central carrier layer of the laminate, thereby forming an anchorage device in the laminate. The gripping device can be attached to the anchorage device after the injection molding process or simultaneously during the injection molding process.

9 Claims, 1 Drawing Sheet

METHOD OF CONNECTING A GRIPPING DEVICE TO A SHEET OR WEB-FORMED PACKAGING LAMINATE

BACKGROUND OF THE INVENTION

Single-use disposable liquid packages are manufactured of flexible laminated packaging material and are used for a plurality of various products, for example milk and juice. Normally, the packaging laminate essentially comprises a central carrier layer of fibrous material, for example paper, which is coated on either face with liquid-tight layers of thermoplastic, primarily polyethylene. When the package is intended for filling with previously sterilized contents, for example UHT treated milk, the packaging material normally also includes a barrier layer of, for example, aluminum foil, which is disposed at the surface of the packaging material facing the interior of the package and is covered with an additional layer of thermoplastic material, preferably polyethylene.

Packages which have been formed by folding and heat-sealing of the laminate often include some form of prepared opening arrangement, for example a line of weakness which defines a tear-off portion of the wall of the package. To facilitate tear-off, the tearable wall portion is often provided with a projecting gripping device by means of which the consumer may open the package. The package may also be provided with handles or other exteriorly applied plastic details.

In the manufacture of packages of the aseptic type, i.e. packages which are intended to be filled with previously sterilized contents, it is of crucial importance that the package be not only liquid-tight, but also gas-tight. Since the packaging material is normally sterilized by passing it through a bath of liquid chemical sterilization agent, it is also important that the packaging material not include any loose or projecting details, since such details—like areas of untightness—not only entrain a concentrated, large volume of sterilizing agent out of the bath, but also impede the removal of the sterilization agent using conventional means such as squeezer rollers and so-called air knives, in other words hot air curtains. Prefabricated details applicable to the outside of the packaging laminate such as gripping devices and handles cannot, therefore, normally be employed in packages of the above-mentioned type.

OBJECTS AND SUMMARY OF THE INVENTION

One object of the present invention is, therefore, to provide a method by means of which packages which have been manufactured from web or sheet-formed packaging laminate may be provided with external details such as gripping devices and handles, even when the packages are of the aseptic type and are intended for sterile contents.

A further object of the present invention is to provide a reliable and purposeful anchorage method for prefabricated plastic details which are to be accessible from the outside of the package.

Yet a further object of the present invention is to provide an anchorage method which ensures reliable retention and which is completely bacteria-tight and well-suited for use in conjunction with packaging laminates of the type which, in a per se known manner, is sterilized by contact with liquiform sterilizing agents.

These and other objects have been attained according to the present invention in that a method of connecting a gripping device to a sheet or web-formed packaging laminate includes providing the packaging laminate with a hole or recess which extends partly through the packaging laminate, whereafter an injection moulding tool is brought into abutment against the laminate such that the hole is surrounded and, on subsequent injection moulding, filled with molten plastic material under high pressure, the plastic material partially penetrating into a delaminated portion of the laminate in the region about the hole.

The method of creating, by injection moulding in a non-penetrative hole or recess in the packaging laminate, a firmly secured anchorage device in the laminate for subsequent anchorage of a gripping device not only makes possible unimpeded handling of the packaging laminate during subsequent sterilization and processing operations, but also affords dependable anchorage possibilities for a prefabricated gripping device subsequently hot-sealed to the anchorage device.

BRIEF DESCRIPTION OF THE ACCOMPANYING DRAWING

One preferred embodiment of the method according to the present invention will now be described in greater detail with particular reference to the accompanying schematic Drawing which solely illustrates the details indispensible for comprehending the invention.

DETAILED DESCRIPTION OF THE PREFERRED EMBODIMENT

Figure 1:
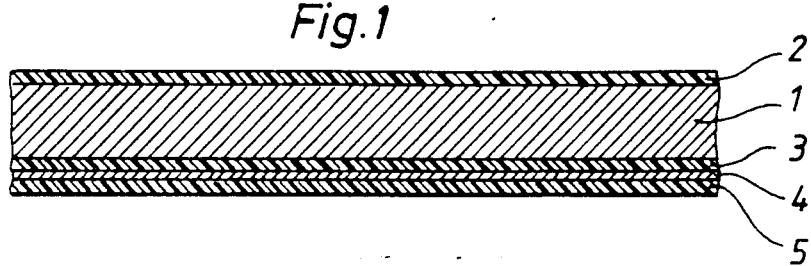
FIG. 1 is a cross-sectional view of a packaging laminate in which the method according to the present invention may be utilized.

Referring to the Drawing, the packaging laminate illustrated in FIG. 1 is a conventional type and essentially includes a central carrier layer 1 of fibrous material, for example paper, which is coated, on either face, with liquid-tight layers 2 and 3 of thermo-plastic material, for example polyethylene. Since particularly stringent demands are placed on the gas-tightness of the packaging laminate—as is the case in, for example, aseptic packages intended for previously sterilized contents, the packaging laminate also includes a barrier layer 4 of a material of high gas-tightness, for example aluminium foil. The barrier layer 4 is placed at that side of the packaging laminate which constitutes the inside of the formed package and is, therefore, covered by an additional layer 5 of liquid-tight thermoplastic material, preferably polyethylene.

Figure 2:
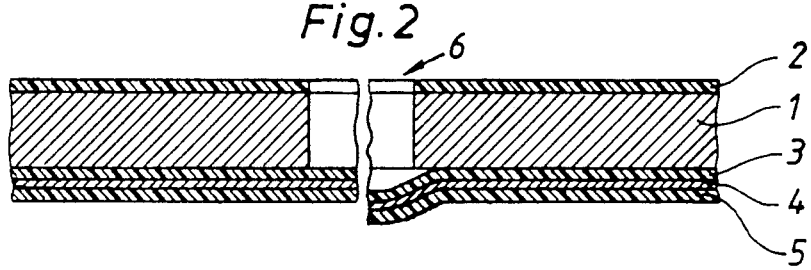
FIG. 2 is a cross-sectional view of the packaging laminate of FIG. 1 prepared for employing the method according to the present invention.

When the method according to the present invention is to be employed in conjunction with a packaging laminate of, for example, the type illustrated in FIG. 1, the packaging laminate is provided with a non-penetrative hole or recess 6 which extends through both the carrier layer 1 and the external thermoplastic layer 2 which, after reforming of the formed packaging laminate into the package, is located on the outside thereof. The hole 6, which is substantially circular and is on a diameter of the order of magnitude of between 3 and 10 mm, is suitably produced by punching of the packaging laminate during its manufacture, i.e. when the carrier layer 1 has been provided with a first layer 2 of thermoplastic material, but before the additional layers 3, 4 and 5 have been applied. The hole 6 may possibly be prepared for subsequent working operations in that the region of the thermoplastic layer 3 adjacent the hole 6 is heated, for example using hot air, and is caused to delaminate and separate somewhat from the adjacent surface of the carrier layer 1, as is illustrated to the right in FIG. 2. This operation may be executed in that the relevant portion of the packaging laminate is placed between two tools, of which the one is provided with a duct for hot air which is directed into the hole 6, and the other is provided with a suitably shaped recess in which the layers 3, 4 and 5 may, after heating and delamination, be depressed. As a result, a space will be created between the thermoplastic layer 3 and adjacent portions of the carrier layer 1, which, in the subsequent injection moulding, may afford improved anchorage or adhesion, as will be explained in greater detail hereinbelow.

Figure 3:
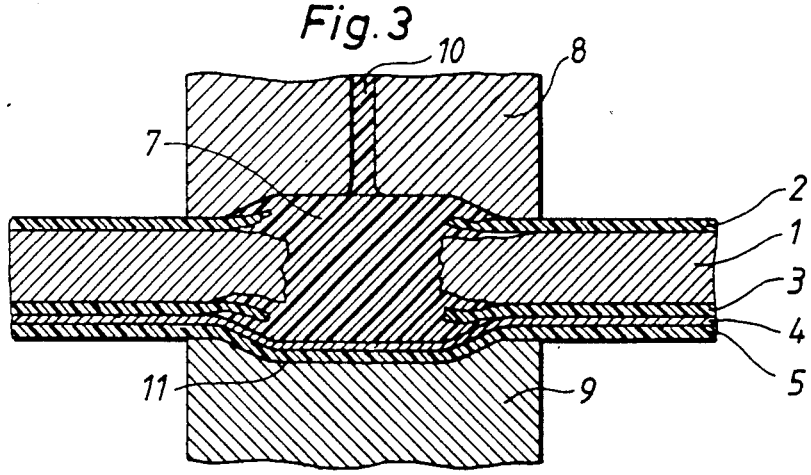
FIG. 3 is a cross-sectional view of the packaging laminate of FIG. 2 illustrating the formation of an anchorage device in accordance with the method according to the present invention.

FIG. 3 shows how the thus prepared packaging laminate is provided with an anchorage device 7 of thermoplastic material in that the portion provided with the hole 6 is placed and fixedly clamped between two halves 8 and 9 of an injection moulding tool. The upper half 8 of the injection moulding tool, which abuts against the upper face of the laminate and surrounds the hole or recess 6, includes a channel 10 for the supply of thermoplastic material, for example polyethylene. In a conventional manner, the channel 10 is connected to an injection moulding unit which may be of per se known type and will not, therefore, be described in-depth in this context. The opposing mould half 9 of the injection moulding tool is placed in abutment against the opposing face of the packaging laminate and displays a shallow depression 11 in which the lower thermoplastic layer of the packaging laminate and barrier material 3, 4 and 5 may be downwardly urged when the hole 6 is filled with thermoplastic material via the channel 10. Upon injection of the thermoplastic material into the hole 6, the material is at such a temperature that it is bonded and partly united with both of the thermoplastic layers 2 and 3 of the packaging laminate, at the same time as it penetrates into and causes a delamination between the fibrous material layer and the thermoplastic layer 3 (or alternatively in the space already prepared as a result of the previously mentioned delamination) in the region around the bottom of the hole 6. By selection of suitable thermoplastic quality, temperature and pressure, there will thus be created a permanent, liquid-tight connection between the anchorage device 7 formed by both halves 8 and 9 of the injection moulding tool and the thermoplastic layers 2 and 3 of the packaging laminate. When the moulding tool is re-opened and both of the mould halves 8 and 9 are separated from one another, the packaging laminate will thus display on its one surface (the upper surface in FIG. 3) a somewhat projecting upper portion of the anchorage device 7 and, on its opposing surface, a gentle bulge which has a form corresponding to the depression 11 and consists of both of the lower layers 4 and 5 of the original packaging laminate—barrier material and thermoplastic, respectively. The important layer 4 of barrier material has, thus, not been penetrated but kept fully intact, which ensures that its gas-tightness is not affected and remains a high level, a basic prerequisite to enable the material to be used for, for instance, aseptic packages.

When the packaging laminate has been provided with anchorage devices in accordance with the method according to the present invention, it is ready for the sterilization which must take place prior to reforming of the packaging laminate into individual packages filled with sterile contents. Sterilization of the packaging laminate is effected in a conventional manner, for example utilizing a liquiform chemical sterilizing agent such as hydrogen peroxide. The packaging laminate which is in sheet or web form is moistened with sterilizing agent, for example by being led into a bath of sterilization agent or by being exposed to spraying, vaporization or the like. In such instances, the sterilizing agent will cover at least the one surface of the packaging laminate, (i.e., the surface facing the interior of the formed package), but may because of the liquid-tight sealing of the anchorage device 7 not penetrate into the material and be absorbed in, for example the carrier layer 1 consisting of fibrous material.

Since the anchorage device 7 intimately follows the surface of the packaging laminate and does not form pockets or other traps, only the requisite amount of sterilizing agent will accompany the packaging laminate. Thus, removal of the sterilizing agent after the desired sterilization time may be effected without hindrance using conventional methods such as squeezer rollers or hot air curtains, so-called air knives. Nor does the configuration of the anchorage device 7 prevent further processing, for example folding and sealing, of the packaging laminate to the contrary, further processing may be undertaken in a conventional manner and using known types of packaging machines.

Figure 4:
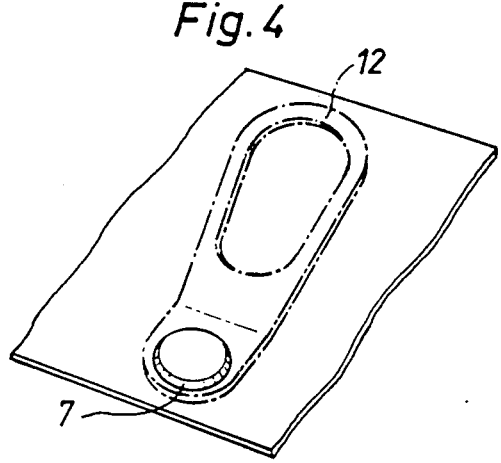
FIG. 4 is a top perspective view of a portion of the packaging laminate of FIG. 3 after application of the anchorage device.
Figure 5:
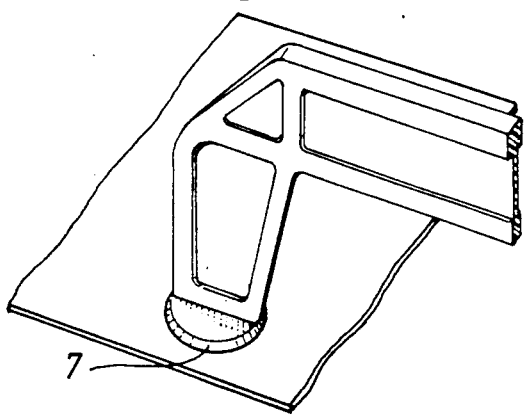
FIG. 5 is a top perspective view of a portion of a packaging laminate which has been provided with a handle employing the method according to the present invention.

When the packaging laminate has thus been formed in a conventional manner into a wholly or partly finished package or carton, the anchorage device 7 may be utilized for applying various prefabricated details such as gripping devices 12 in the form of a pull-ring or a handle (see FIG. 4). The prefabricated gripping device 12 consists, in this instance, preferably of the same type of plastic material as was employed in the manufacture of the anchorage device 7, thereby ensuring that a simple seal, with the aid of heat and pressure, may be effected which possesses durable mechanical strength. As has been previously mentioned, the gripping device may consist of a pull-ring which is to be employed when the package is to be opened, for example in that a portion of the wall of the package provided with a tear line or line of weakening is removed.

The method according to the present invention may also be employed, after the formation of a sheet or web-formed packaging laminate into wholly or partly finished packages, to apply a gripping device 12 in the form of a handle directly to the outside of the package whereby the anchorage device 7 and the handle are integral and are injection-moulded simultaneously using suitably designed injection moulding tools. In such cases, there will be obtained an extremely reliable anchorage of the handle in the packaging laminate, at the same time as the unbroken inner layers 4 and 5 of the packaging laminate ensure superior tightness against both gas and liquid.

Hence, the method according to the present invention makes it possible, in particular in aseptic packages, to ensure a reliable gas and liquid-tight anchorage of external details such as gripping devices of different designs. The method is well-adapted to state-of-the-art production methods for packages and may, therefore, be utilised without any appreciable modifications in conjunction with those types of packaging machines which are currently in use.

While this invention has been illustrated and described in accordance with a preferred embodiment, it is recognized that variations and changes may be made and equivalents employed herein without departing from the invention as set forth in the claims.

What is claimed is:

1. A method of attaching a gripping device to a packaging laminate comprising the steps of:
   forming the packaging laminate with a recess, wherein said packaging laminate includes a central carrier layer, a first plastic layer on one side of the central carrier layer, a second plastic layer on an opposite side of the central carrier layer, a gas-tight barrier layer on the second plastic layer and a third plastic layer on the barrier layer, said recess extending through only said first plastic layer and said central carrier layer;
   placing one part of an injection molding tool against the first plastic layer in surrounding relation to the recess, and placing another part of the injection molding tool which has a depression formed therein against the third plastic layer at a position opposite the one part of the tool;
   delaminating the second plastic layer from the central carrier layer around said recess;
   injecting molten plastic material under pressure through a channel in the one part of the tool and into the recess to cause the molten plastic to penetrate the delaminated region and to cause the molten plastic to be partly united with the first and second plastic layers while also causing the second plastic layer, the barrier layer and the third plastic layer to be urged into the depression, thereby forming an anchorage device; and
   attaching a gripping device to the anchorage device.

2. The method according to claim 1, wherein the step of attaching a gripping device to the anchorage device is performed after the formation of the anchorage device.

3. The method according to claim 1, wherein the step of attaching a gripping device to the anchorage device occurs simultaneously with the injection molding of the anchorage device.

4. A method of forming an anchorage device on a packaging laminate which includes a central carrier layer, a first liquid-tight plastic layer on a first side of the central carrier layer and a second liquid-tight plastic layer on an oppositely positioned second side of the central carrier layer, comprising the steps of:
   forming the packaging laminate with a recess that extends through only the central carrier layer and the first plastic layer;
   placing one part of an injection molding tool against the first plastic layer and in surrounding relation to the recess, and placing another part of the injection molding tool against an opposite side of the packaging laminate;
   injecting molten plastic material through the one part of the injection molding tool and into the recess to cause the molten plastic material to penetrate a delaminated region located between the central carrier layer and the second plastic layer in an area surrounding the recess and to cause the molten plastic material to become united with the first and second plastic layers, thereby forming an anchorage device in the packaging laminate to which a gripping device may be attached.

5. The method according to claim 4, wherein said delaminated region is formed by heating the packaging laminate in an area surrounding the recess prior to injecting the molten plastic into the recess.

6. The method according to claim 4, wherein said delaminated region is formed as a result of the injected molten plastic being of sufficient temperature to cause the second plastic layer to become delaminated from the central carrier layer when the molten plastic is injected into the recess.

7. The method according to claim 4, including the step of forming the packaging laminate into a container with the first plastic layer disposed on the interior of the container.

8. The method according to claim 4, wherein the step of forming the packaging laminate with a recess includes the steps of punching a hole entirely through a laminate that includes the central carrier layer and the first plastic layer and thereafter, sealing the second plastic layer to the second side of the carrier layer.

9. A method of forming an anchorage device on a packaging laminate so that a gripping device can be attached to the packaging laminate, comprising the steps of:
   providing a first liquid-tight plastic layer on a first side of a carrier layer;
   forming a hole that extends through the carrier layer and the first plastic layer;
   forming the packaging laminate by applying a second liquid-tight plastic layer on a second side of the carrier layer which is opposite to the first side so that said hole is covered at one end by said second plastic layer;
   enclosing said hole with an injection molding tool; and
   injecting molten plastic material into said hole to cause the molten plastic material to become united with the first and second plastic layers, thereby forming an anchorage device in the packaging laminate to which a gripping device may be attached.

* * * * *